Dec. 24, 1940.  A. CHRISTIANSON  2,225,951
VEHICLE PASSAGEWAY ARRANGEMENT
Filed Dec. 27, 1937  4 Sheets-Sheet 1
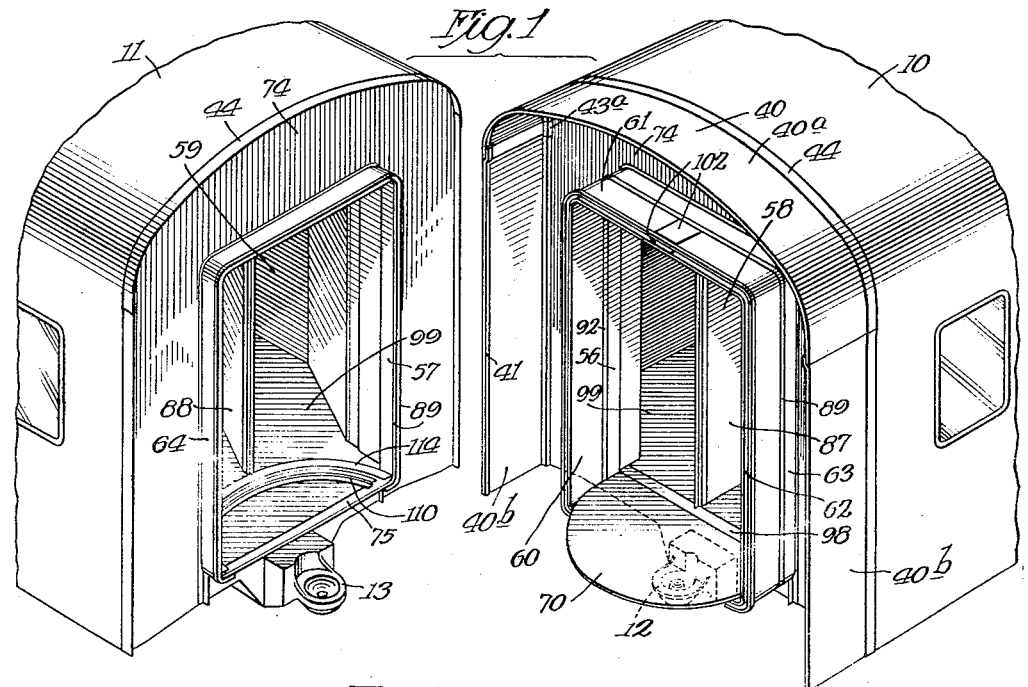
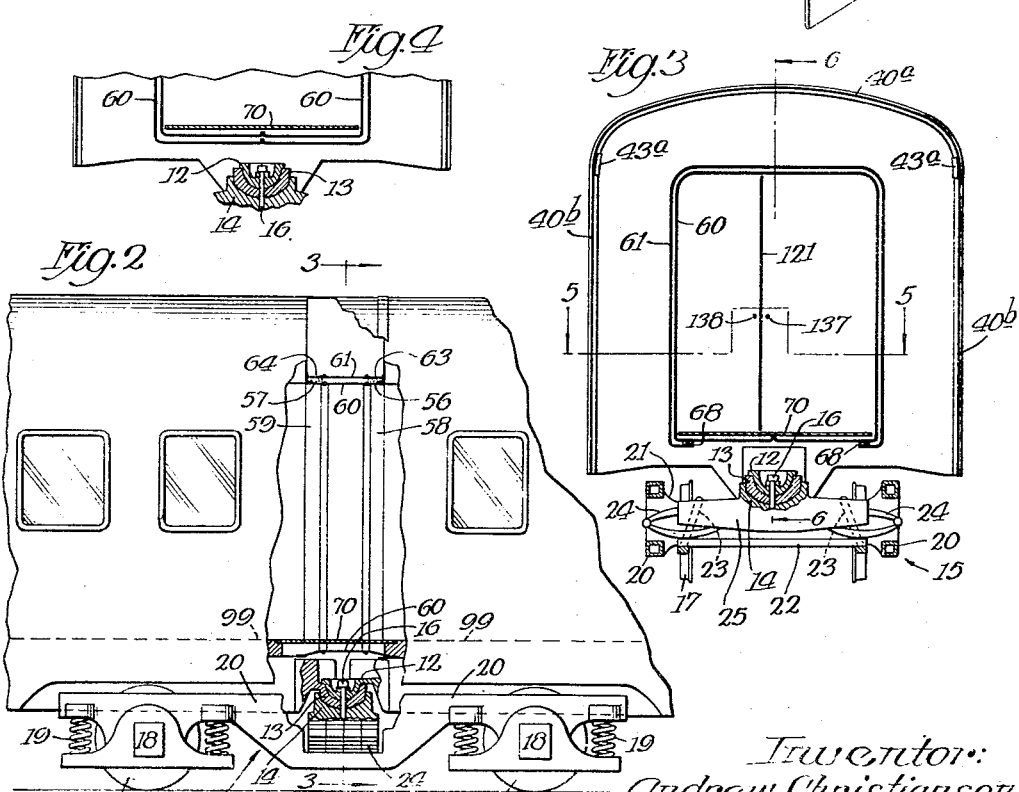

Dec. 24, 1940.   A. CHRISTIANSON   2,225,951
VEHICLE PASSAGEWAY ARRANGEMENT
Filed Dec. 27, 1937   4 Sheets-Sheet 2

Inventor:
Andrew Christianson
By Oscar Hochberg. Atty.

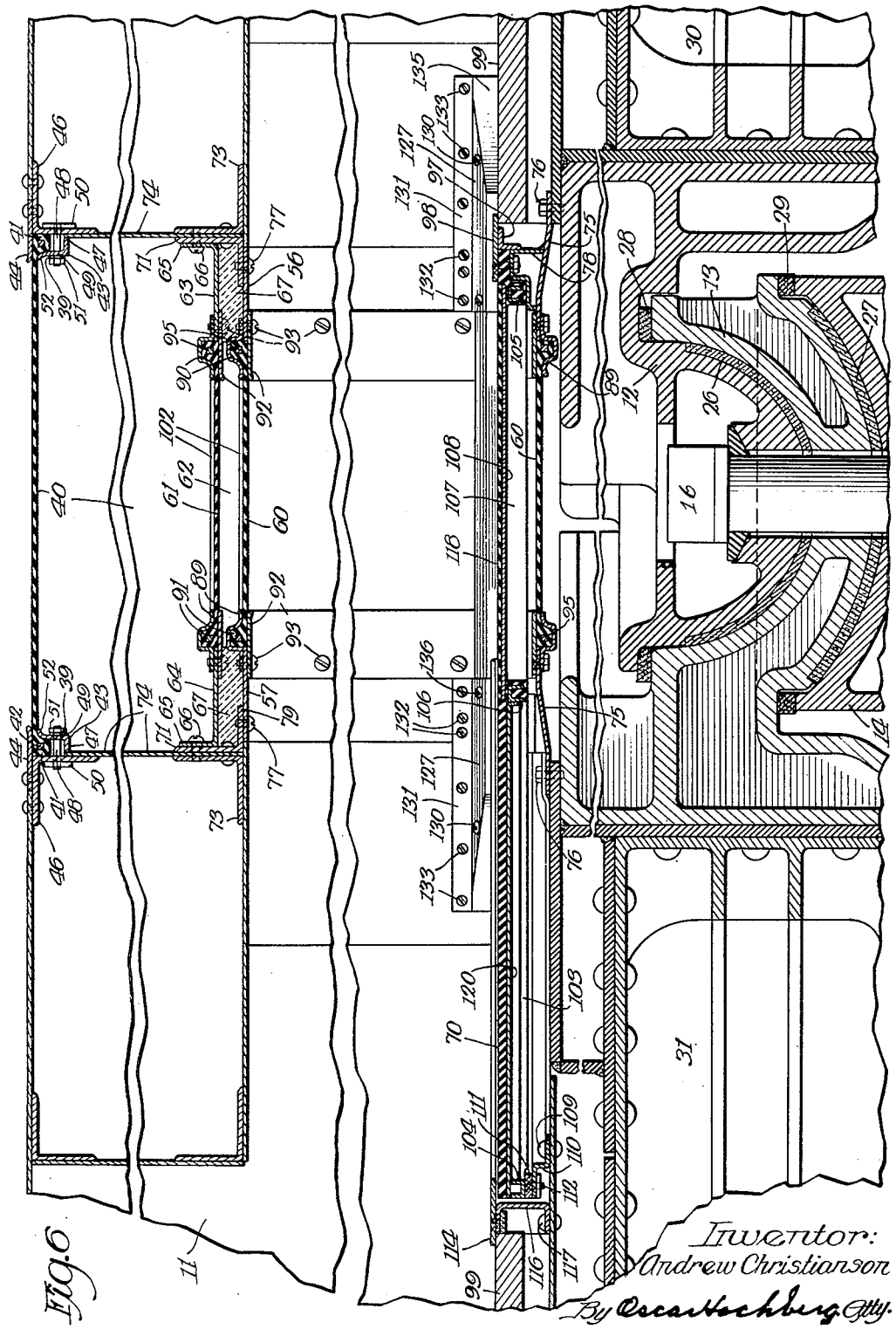

Dec. 24, 1940.   A. CHRISTIANSON   2,225,951
VEHICLE PASSAGEWAY ARRANGEMENT
Filed Dec. 27, 1937   4 Sheets-Sheet 4
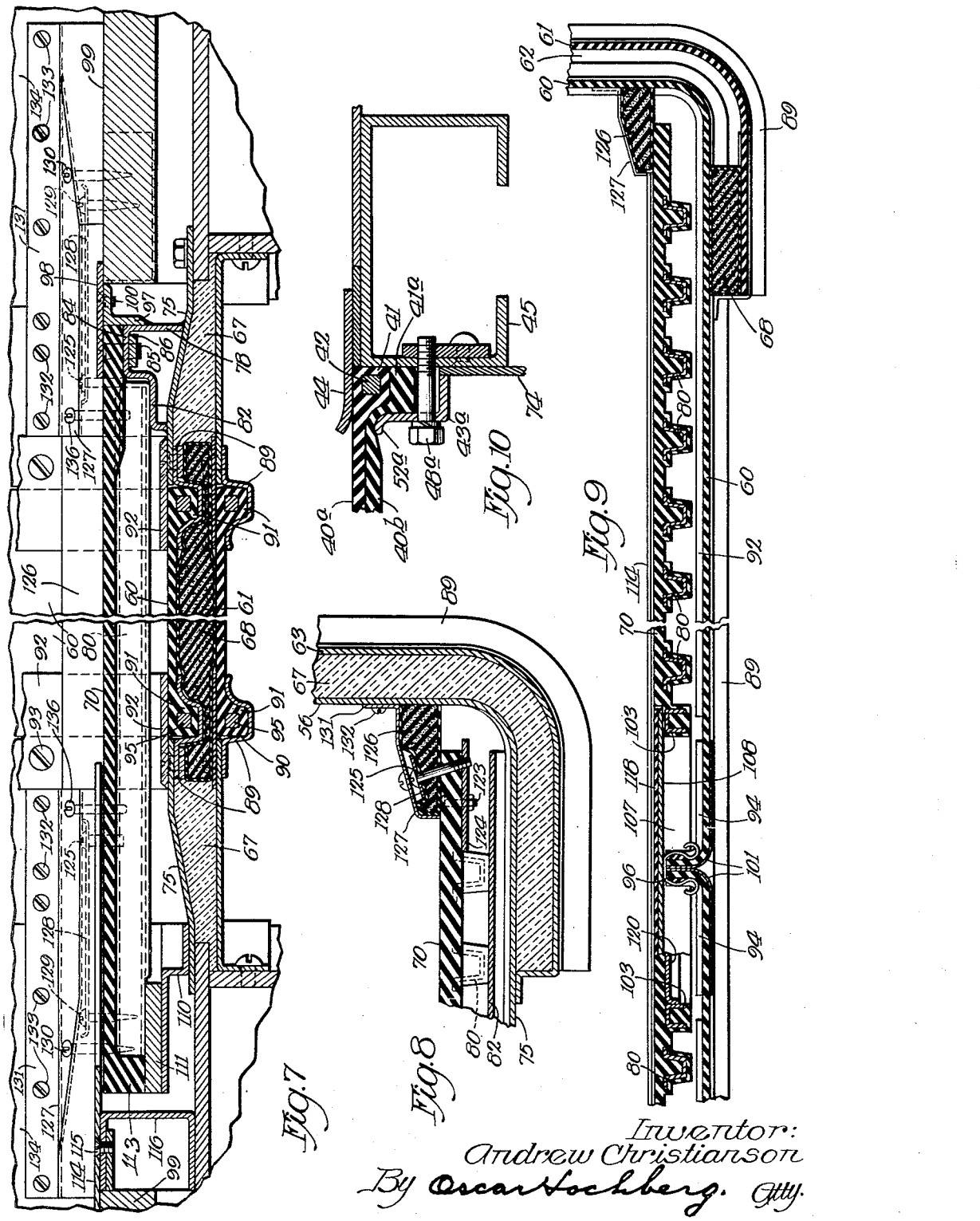
Inventor:
Andrew Christianson
By Oscar Hochberg. Atty.

Patented Dec. 24, 1940

2,225,951

UNITED STATES PATENT OFFICE 2,225,951

VEHICLE PASSAGEWAY ARRANGEMENT

Andrew Christianson, Hammond, Ind., assignor to Pullman-Standard Car Manufacturing Company, Chicago, Ill., a corporation of Delaware Application December 27, 1937, Serial No. 181,787

21 Claims. (Cl. 105—15)

This invention relates to vehicles articulated to provide multi-section units and has for its primary purpose the provision of a continuous, fully enclosed, non-telescoping passageway construction of increased width and insulated for use between air conditioned units of this type.

Another important object of the invention is the provision of a footplate for adjoining articulated vehicles affording a rigid bridge across the space between the vehicles but having inherent flexibility transversely of the vehicles.

The specific object of the invention is the provision of a fully insulated passageway between adjoining vehicles comprising spaced, concentric, inherently elastic diaphragms in tension between the vehicles and sealed to provide a closed pocket of non-circulating air preventing heat transfer action therethrough and completely encircling the passageway.

An object of the invention is the provision of a diaphragm of sufficient width to provide a plurality of passageways therethrough by means of a flexible partition therein.

Another object of the invention is the provision of a passageway footplate for use between adjoining vehicles positively secured to one of the vehicles but in a flexible manner.

The foregoing and other objects are attained by the construction shown in the accompanying drawings, in which:

Fig. 1 is a general perspective view of the adjoining ends of the units of an articulated-section vehicle separated to show the passageway diaphragm and footplate disconnected from one unit and illustrating their relation to the associated parts of the respective units;

Fig. 2 is a side elevational view illustrating the adjoining ends of two vehicles articulated on a single truck and showing the continuity of the diaphragm;

Fig. 3 is a cross-sectional view through the diaphragm taken on the line 3—3 of Fig. 2 at the point of articulation and showing the passageway fully enclosed by the diaphragm.

Fig. 4 is a similar view of a fragmentary portion of the passageway showing a modification in that both diaphragms completely encircle the passageway;

Fig. 6 is a vertical, longitudinal, sectional view through the center of articulation taken on the line 6—6 of Fig. 3 and showing the footplate and passageway in detail and the articulated center plates;

Fig. 7 is a fragmentary, sectional view to a larger scale through the footplate and diaphragm taken on the line 7—7 of Fig. 5 and illustrating the manner of securing the footplate and the method of sealing the edges;

Fig. 8 is a fragmentary, transverse, sectional view of the sealing means for the side edges of the footplate taken on the line 8—8 of Fig. 5;

Fig. 9 is an enlarged, transverse, staggered sectional view through the footplate and diaphragm taken on the line 9—9 of Fig. 5; and Fig. 10 is a cross-sectional view through the streamlining diaphragm connection at the overlapping zone between the top or roof section and a vertical side leg portion.

Figure 5:
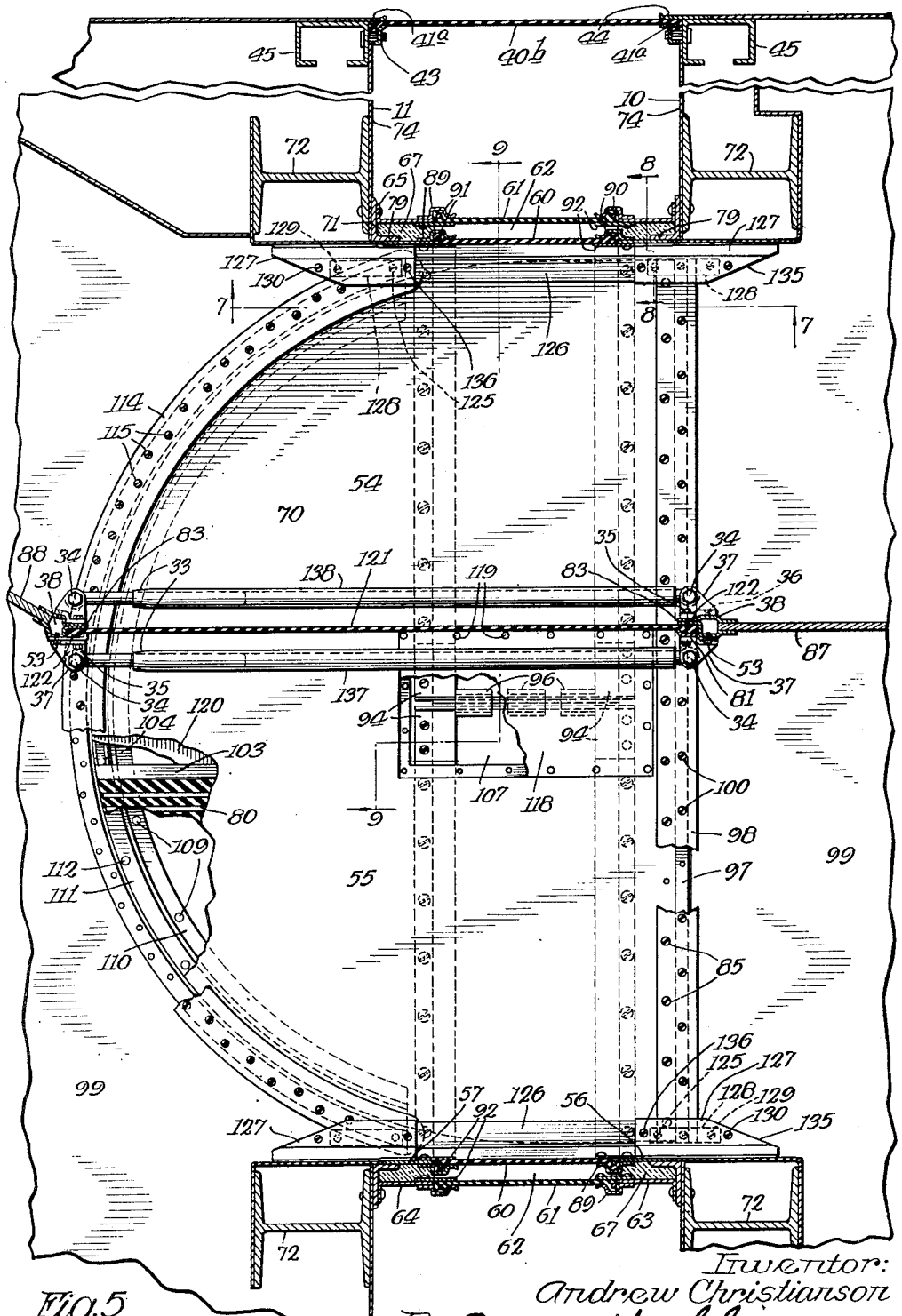
Fig. 5 is a horizontal, sectional view through the diaphragms and end wall framing structures taken on the line 5—5 of Fig. 3 and showing the laterally flexible footplate in plan.

In the drawings, 10 and 11 represent male and female units, respectively, of an articulated section vehicle, having body center plates 12 and 13 nesting respectively one within the other and supporting the adjoining ends of the two units on a single truck 15, as best shown in Fig. 2, by means of a truck center plate 14 into which the nested body center plates 12 and 13 are seated and secured by a locking king pin 16. The truck 15 comprises wheels and axles 17 having journal boxes 18 supporting a truck frame 20 by means of springs 19. The truck frame 20 includes transom members 21 from which spring plank 22 is swingingly suspended by means of swing hangers 23. Bolster springs 24 are seated upon the spring plank and resiliently support the swing bolster 25 with which the truck center plate 14 is integrally formed or, if desired, to which it may separately be attached. Body center plates 12 and 13, as best shown in Fig. 6, are provided with separate bearing faces 26 and 27 interposed between their respective wearing surfaces and at the truck center plate 14. The bearing surfaces 26 and 27 are protected from the entrance of dirt and moisture by means of felt rings 28 and 29 disposed in sealing relation at the periphery of the respective joints. The center plates 12 and 13 are suitably secured to the respective underframes 30 and 31 in any desired manner and designed to transmit to the longitudinal sills thereof the rotative forces set up as a result of eccentric loading inherent in an articulated connection in addition to the usual buff and draft forces.

As shown, the vehicles are of general streamline form, and to preserve this smooth contour between units at the articulation, a flexible streamlining diaphragm 40 is provided which extends the full height of the respective sides and across the width of the smoothly curved roof. The diaphragm 40 is of rubber stretched taut between the vehicle units at their perimeter— providing a continuous, smooth, unbroken surface throughout the length of an articulated vehicle, thereby greatly enhancing the esthetic qualities of the vehicle and affording the ultimate in streamlining between units of this type. The diaphragm itself comprises a flat sheet of rubber 40 of a width which, when applied, will be normally taut, but in which the full elasticity of the rubber is available to afford the stretch necessary as the vehicle units angle with respect to one another in passing about a curve in the track, at which time the diaphragm is placed under tension on one side and extended beyond its normal dimension, but on the opposite side becomes slack and collapses as the units approach each other on that side. The rubber diaphragm 40 is provided with integral enlargements 41 at its opposite edges, affording means of attachment to the respective vehicle units. The enlargements 41 each have a center core 42 of flexible material adapted to reinforce the enlargements and insure the stability of the connections, but which allows sufficient flexing of the rubber to permit ready application of the diaphragm to an irregular contour or for handling purposes. The method of securing the diaphragm 40 to the respective units 10 and 11 maintains a smooth outward appearance and provides a connection which prevents the concentration of stresses in the rubber at localized points and avoids abrasion and tearing of the rubber. The connections to the adjoining units are made without penetrating the rubber and comprise clamping members 43 adapted to engage the enlargements 41 securely to bind the diaphragm 40 between the two units 10 and 11 in uniformly taut relation. The enlargements 41 are turned inwardly and are engaged by the clamps 43 on the inner side of the diaphragm 40 whereby the streamline outer surface is preserved.

The streamlining diaphragm is secured in place from the inner or passageway side, and for this purpose and to provide an abutment against which the enlargements 41 might be clamped, an overhanging, flat plate member 44 is placed about the periphery of the ends of the respective adjoining vehicle units and secured to the corner posts 45 at the sides and to the end carline members 46 at the roof by means of rivets, as shown, or by any other suitable fastening means. The clamps 43 are in the form of angle members, one flange 47 of which is adapted to bear edgewise against portions of the respective end walls reinforced by the framing members 45 and 46 and adapted to fulcrum about this edge bearing as the nuts 39 on stud bolts 48, passing through the flange 49, are tightened to draw that flange against the enlargement 41 to clamp the streamlining diaphragm against the abutment afforded by the overhanging plates 44, thereby securely to hold the diaphragm in place against the tension exerted thereon as the vehicle units pivot with respect to each other. The bolts 48 are threaded into the framing members 45 and 46 which are provided with small metal plates 50 welded thereto and spaced at intervals coincident with the spacing of bolts 48 and affording additional thread area for the bolts to resist the stresses induced by the diaphragm 40 under tension. Lockwashers 51 insure permanent retention of the nuts 39 at their original adjustment. The flange 49 of the clamp 43 at its edge where it engages the enlargement 41 of the diaphragm 40 is curved as at 52 to avoid abrasion of the rubber, and the exposed edge of the overhanging abutment plate 44 likewise is curved for this same purpose, whereby the rubber is free to stretch or flex in response to movement of the vehicles without undue wear or strain on this connection.

The diaphragm, as shown, preferably is formed in three sections—the top or roof section 40ᵃ and the respective side wall portions 40ᵇ, as best shown in Fig. 1. The top section 40ᵃ is disposed in overlapping weathershedding relation to the respective side wall portions 40ᵇ, and, as best shown in Fig. 10, the beads or enlargements 41 and 41ᵃ of the respective sections are disposed in overlapping interlocking relation between the separate clamp members 43ᵃ used at these points and the overhanging shoulder providing flange 44. It will be noted that the beads or enlargements 41ᵃ on the side sections of the diaphragm are of different cross-sectional contour in the area of the overlap than in the remainder of the diaphragm. The bead 41 for the roof section of the diaphragm is of constant cross-section, but that on the side portions is of less thickness at the overlap and of greater length and the center core 42 is eliminated; and the diaphragm, where it connects with the bead, is shaped to the curve of the bead 41 on the roof section 40ᵃ so that the bead and body portion of the side diaphragm 40ᵇ closely engages that of the diaphragm top.

The side diaphragm, where it joins with the narrowed head 41ᵃ is of thinner section so that the clamp 43ᵃ for the overlap is not only in interlocking relation with the side diaphragm, with which it directly engages, but, through that diaphragm, is in overlapping, interlocking relation with the top diaphragm; and the curved end 52ᵃ of the clamp 43ᵃ, while it engages the side diaphragm, overlaps the plane of the bead 41 and the core 42 of the diaphragm top, whereby either diaphragm is prevented from slipping past the other and becoming disconnected under tension. The clamps 43ᵃ are individual members coextensive with the overlapping zone of the diaphragms and are secured by cap screws 48ᵃ and function exactly like the clamp members 43. It will be seen that the connections 43 and 43ᵃ afford means for easily installing the diaphragm 40 under the slight initial tension necessary to maintain the desired tautness.

The adjoining vehicles 10 and 11 are provided with a communicating passageway affording a complete enclosure continuous between vehicles. The vehicles 10 and 11 are air conditioned and freely communicate one with the other, since end doors are not used in the respective vehicles and it is therefore necessary that the passageway be completely insulated between vehicles to preclude any possibility of heat transfer therethrough. The passageway comprises a footplate 70, providing an uninterrupted walkway between the vehicles, and a diaphragm 60 extending beneath the footplate and completely encircling the passageway to provide a fully enclosed weatherproof passage from one vehicle to the other. A second diaphragm 61 is disposed about the diaphragm 60 in spaced relation thereto and sealed to provide a dead air space 62 affording insulating properties. The diaphragm 60 extends between and is secured to metallic extension structures 56 and 57.

disposed about the respective passageway openings 58 and 59. The diaphragm 61 extends between and is secured to metallic extensions 63 and 64 disposed in spaced concentric relation about the respective extensions 56 and 57. The extensions 56 and 57 are substantially alike and comprise each a plate member extending continuously about the respective passageway openings and secured at the top and sides by screws 77 to the projecting flange 79 of an angle member 71 shaped to the contour of the openings and which is secured, through the end wall sheathing 74, to the spaced end posts 72 and end plate 73, as best shown in Figs. 5 and 6. The horizontal bottom portion 75 of the respective extensions 56 and 57 is separate for construction purposes, but is welded to the vertical side legs with which the horizontal top portion is integral so that, in effect, and for all practical purposes, the extensions are in one piece and continuous about the respective passageway openings. The bottom portion 75, as shown in Figs. 6 and 7, slopes downwardly and is removably secured to the respective vehicle underframes 30 and 31 by cap bolts 76.

The extensions 63 and 64 may or may not extend continuously about the extensions 56 and 57, as best represented in Figs. 3 and 4, but are shown in detail as extending about the top and sides and portions of the bottom, as illustrated in Figs. 8 and 9. The extension plates 63 and 64 are flanged as at 65 and secured by screws 66 to the webs of the angle members 71 and through the end sheathing 74 and the end posts 72. The space between the extensions 56 and 63 and 57 and 64 is utilized for the accommodation of insulation 67, and at the bottom, where the outside extension plates terminate at each side, the space is closed by turning the outer plate inwardly and providing a flange bearing against the inner extension plates, as shown in Fig. 8. Thus the passageway is completely insulated from one vehicle to the other by means of the double diaphragm construction, more fully hereinafter described, and the insulated metal extension structures.

A separate formed member 89 is disposed about the edge periphery of each of the respective extensions 56, 57, 63 and 64, and, while in actual practice it is in several pieces, the adjoining members are butt-welded together to form unitary members extending continuously about the respective extension plates and integrally secured thereto by welding, so that each of the assemblies, as applied, is substantially a one-piece unit. The members 89 are secured about the outer surfaces of the respective extension plates and are shaped to provide grooves 90 opening inwardly and adapted to receive the respective enlargements 91 at opposite edges of the diaphragms 60 and 61 in close engagement and which are held securely in place therein by clamping plates 92 removably secured to the extensions by screws 93 and overlapping the grooves 90. The clamping plates 92 engaging the inner continuous diaphragm 60 are continuous about the top, sides and portions of the bottom, but, as best shown in Fig. 9, separate pieces 94 are utilized adjacent the point where the ends of the diaphragm are joined for holding the enlargements 91 properly in place within the respective grooves 90. The enlargements 91, like those in the streamlining diaphragm, are reinforced by flexible cores 95, but in the application of the inner passageway diaphragm 60 the enlargements are directed outwardly in order that a smooth inner surface may be presented to the passageway free of any obstruction. The enlargements on the diaphragm 61 are also directed outwardly to avoid spacing the diaphragms the greater distance which would otherwise be necessitated should the enlargements 91 be arranged in opposing relation. The diaphragms 60 and 61 are inherently elastic, and the enlarged edges are confined in the grooves 90 by the clamping plates 92 and the diaphragms initially stretched taut between adjoining passageway extensions 56—63 and 57—64, and relative pivotal movement between the units 10 and 11 is accommodated by the inherent elasticity and flexibility of the diaphragms—one side thereof being stretched during such movement, while the opposite side is flexed. The passageway diaphragm is thus mounted between the units 10 and 11 under initial tension and, thus disposed, offers the utmost safety to persons traversing the passageway. The diaphragm 60 is in one piece continuous about the passageway and joined at the bottom beneath the footplate 70.

The ends of the diaphragm are turned upwardly beneath the footplate where they join and are held in sealing relation by clamp members 96 drawing the ends together and by the clamping plates 94. As best shown in Fig. 9, the diaphragm ends, where they join, are reinforced by fabric 101 vulcanized thereto to prevent any possibility of tearing of the rubber. At the center of the diaphragms, no stretch occurs other than the initial tension applied, but, due to the pivotal relation of the articulated vehicles, considerable twisting action occurs in the rubber in this area, and to strengthen it against this constant wear the diaphragm tops, at this center portion, are reinforced by fabric 102 vulcanized thereto, as best shown in Figs. 1 and 6. The diaphragm 61 is continuous about the top and sides of the passageway and extends partially beneath the passageway at each side. Where the diaphragm terminates at the bottom at each side, a seal is formed between the respective diaphragm ends and the inner diaphragm 60 by sponge rubber pads 68, as best shown in Figs. 7 and 9. The pads 68 each are clamped between the metal extension structures 56—63 and 57—64 and extend from one to the other in sealing relation between the diaphragms 60 and 61, whereby a dead air space 62 is effected between the diaphragms providing adequate insulation for the passageway, although a layer of insulation may be utilized to fill the space between the diaphragms if desired. The sponge rubber pads 68 will stretch and flex with the diaphragms as the units 10 and 11 pivot relatively and effectively seal the space between the diaphragms at all times. If desired, the outer insulating diaphragm 61 may be extended beneath the footplate, as shown in Fig. 4, and joined at the center exactly as in the case of the inner diaphragm 60—thus providing a layer of insulation completely encircling the passageway.

The footplate 70 is rigid across the space between the adjoining units 10 and 11, but the great width of the passageway necessitates some provision for relative weaving motion between the units, and, to accommodate this movement best, the footplate is made flexible in a transverse direction and is adapted to weave with the individual units as the need arises. The footplate is composed of rubber and is substantially semi-circular in shape, as shown in Fig. 5, and is flexibly, but positively, secured to the unit 10, while its arcuate free edge merely rests in a similarly shaped recess in the floor 99 upon the unit 11, but is restrained from possible upward movement. Flanged channel stiffening members 80, embedded within the rubber and extending longitudinally between the vehicles, rigidify the footplate across the passageway and are entirely independent of and not connected one with the other in any manner other than afforded by the rubber comprising the footplate proper, whereby the footplate is free to flex and weave in a transverse direction with the individual vehicle units 10 and 11 as they rock laterally with respect to one another. The members 80, as best shown in Fig. 7, stop short of the edge of the footplate secured to the unit 10 so that the footplate is secured solely through the rubber, whereby a flexible connection is provided permitting the footplate to flex at this point as the units 10 and 11 move vertically relatively to each other.

The rubber of the footplate extending beyond the stiffening members to provide the flexible connection is clamped to the unit 10 so that vertical movement of the footplate must be through flexing of the rubber. A stepped channel-shaped member 78, secured to the bottom extension plate 75 by welding, supports the footplate on the unit 10, and an angle member 97, secured to the member 78 by welding, provides means of attachment for a clamping plate 98. The thickened portions or ribs of the footplate reinforced by the members 80 rest upon the stepped portion 82 of the member 78, and the rubber extending therebeyond is clamped to the upper surface 84 by the plate 98 through the medium of machine screws 85 having countersunk heads and threaded into the thickening members 86 welded beneath the surface 84 at the same spacing as the screws. The clamping plate 98 is secured to the angle 97 by countersunk screws 100 and overlaps the vehicle floor 99 as well as the footplate, thereby acting more or less as a threshold plate. It is to be noted that the ribs of the footplate reinforced by the members 80 underlie the footplate proper comprising the layer of rubber providing a smooth surface and of which the rubber clamped by the plate 98 is an extension.

The arcuate free edge of the footplate is supported on the unit 11 by a Z-shaped member 110 shaped to the arc about which the footplate rotates and secured to the underframe 31 by rivets 109 taking one flange of the Z. A non-metallic plate 111 is secured to the supporting flange of the Z by countersunk screws 112 and provides a bearing surface for the footplate coextensive with the arcuate Z member. It is to be noted that the rubber on the underside of the members 80 is cut away to the level of their bottom surfaces at the points where they bear on the surface 111 so that a metallic supporting and wearing surface is exposed to the member 111 at each of these points, whereby the rib of rubber 113 extending about the arcuate edge of the footplate connecting all of the ribs 80 is relieved of the major portion of the load of supporting the footplate and therefore prevented from excessive abrasion. An arcuate threshold plate 114 overlaps the arcuate free edge of the footplate and prevents any possibility of the footplate moving upwardly. The plate 114 is secured to the unit 11 by countersunk screws 115 taking the horizontal top flange of a channel member 116 shaped to the arc of the plate 114 and the footplate and secured to the underframe 31 by rivets 117 taking the horizontal bottom flange thereof. The threshold plate 114 overlaps the floor 99 of unit 11 as well as the footplate. The flanged channel reinforcing members 80 are omitted from the footplate directly through the center thereof longitudinally and a rectangular frame substituted therefor. The rectangular frame comprises a pair of spaced inverted channels 103 extending longitudinally across the footplate from a point just short of the flexible fixed edge to the arcuate free edge and connected by similar cross members 104 and 105 at their ends and by cross member 106 intermediate their ends—all integrally secured together by welding.

The members 103 and 105 and 106 are embedded in the rubber of the footplate and form a rectangular opening 107 disposed directly above the joint between the passageway diaphragm edges beneath the footplate and the center plates and king pin arrangement, and through which these parts are readily accessible. The opening is covered by a removable metal plate 108 having a layer of rubber 118 cemented thereto providing a surface flush with the remaining surface of the footplate. This cover plate is inset with respect to the footplate to provide a flush surface and is secured in place by means of countersunk screws 119. It is to be noted that the metal plate 108 rests on an intervening layer of rubber on the channel members 103 and 105 and 106 so as to eliminate any possibility of rattling. The channel member 106, on its side not bordering the opening 107, is not covered with rubber but is left exposed, as are the members 103 on their respective sides facing each other, and a flanged plate member 120, supporting the layer of rubber comprising the footplate proper, is secured to the sides of the members 103 and 106 by welding with its surface on a level with the surface of the members 103 and 106 properly to support the rubber of the footplate throughout the area defined by the frame members 103 and 106 to one side of the opening 107. The end cross member 104 extends between the side flanges of the plate 120 and is disposed with the flanges of the channel in engagement with the under surface of the plate and welded thereto, and the web provides a supporting surface bearing on the nonmetallic surface 111. The channel member 104 is shaped to the arc of the free edge of the footplate. From the construction described, it will be seen that the footplate affords a rigid bridge across the space between the two vehicle units 10 and 11 but free to flex and weave transversely in response to such movement of the respective vehicles and, while the rectangular frame comprised of the members 103, 104, 105 and 106 creates a rigid area directly through the center of the footplate, the width of the frame is such as not to affect the flexibility of the footplate transversely.

A seal is provided at each of the side edges of the footplate between the footplate and inner diaphragm 60. These seals comprise each a pad of sponge rubber 126 extending between housings 127 secured respectively to the floor 99 on the unit 11 and to the footplate and the floor 99 on the unit 10 and adapted to bear against the footplate and the diaphragm at each side and to be stretched or flexed as the vehicle negotiates curves in the track, and effectively seal the space existing between the respective footplate edges and the diaphragm sides. The sponge rubber is secured to the respective vehicle units independently of the housing members, as best shown in Fig. 8. Similar plate members 128, having curved edges to avoid abrasion of the rubber, clamp each of the pads 126 at opposite ends to the respective units and are secured each by screws 129 entering the respective floors and machine screws 125 taking the threshold plate 114 on the unit 11 and a plate 124 provided for the purpose secured beneath the footplate on the unit 10 by bolts 123. The housings 127 act as guards covering the ends of the sponge rubber sealing members and the clamping devices and are secured to the respective units 10 and 11 by screws 130 taking the floors 99 and machine screws 136 taking the plate 124 on the unit 10 and the threshold plate 114 on the unit 11. The upwardly turned flanges 131 on the housings are secured by screws 132 and 133, respectively, to the extension frames 56 and to the sheathing 134, thus effectively rigidifying the housings. As best shown in Fig. 5, the housings 127 are sloped at their ends adjacent the respective end doorways, as at 135, to avoid projections immediately at the door openings.

The important feature of this invention is the exceptional width of the footplate and passageway diaphragm whereby, when desired, a double passageway may be provided by means hereinafter described, although, under certain prescribed conditions, the dual feature might be dispensed with and the great width of the passageway utilized to advantage. The duality of the passageway is accomplished by means of a flexible partition stretched in tension between the units 10 and 11 through the passageway at a point providing separate passageways of the respectively desired widths. The units 10 and 11, in the present instance, happen to be a combination of dining car and permanently associated kitchen car, respectively, and the separate passageways are used separately by the passengers and by the crew respectively, although this dual feature might be used in other combinations of cars. The flexible partition comprises a curtain 121 of sheet rubber having integral enlargements or beads 122 in its opposite edges adapted to provide means of attaching the curtain to fixed partitions 87 and 88 on the respective units 10 and 11. The curtain extends continuously from the surface of the footplate to the top of the passageway and between the fixed partitions and is adapted to stretch and flex in response to relative movement between the units, and provides two completely separated passageways 54 and 55 for the use of passengers traversing the passageway and members of the dining car crews, respectively. The curtain 121 is secured in tension between the units 10 and 11 in substantially the same manner as the diaphragms 40, 60 and 61 without perforation of the rubber. The beads 122 are confined between projecting shoulders 83, on the partitions 87 and 88, and clamping members 81 engaging the shoulders afforded by the beads and removably secured by screws 53 to the respective fixed partitions. The partitions 87 and 88 terminate in hollow post members 38, thus greatly rigidifying the partitions where the curtain 121 connects thereto. It will be noted that the dividing partition 121 is disposed slightly to one side of the center of the passageway whereby the dining car crew's side 55 is of greater width than that afforded on the passengers' side 54, and this to afford the greater space necessary to provide for waiters carrying trays or the like and as a result of which the partition is subjected to greater tension than otherwise would be exerted if it were mounted directly on the center of the passageway, but which the partition is well able to stand due to its flexibility and inherent elasticity. As shown in Fig. 5, telescopic guard rails 137 and 138 are disposed upon opposite sides of the flexible partition 121 in position to be grasped by persons passing through the respective sides of the passageway for the waiters and passengers. The separable sections of the respective guard rails are hingedly secured to the hollow post portions 38 of the respective partitions 87 and 88 through the medium of brackets 37 secured thereto by countersunk screws 36 and bolts 35—the guard rail sections being pivotally connected to the brackets by bolts 34. The outside tubular guard rail sections are tapered at 33 where they join with the inside rod sections to avoid the abrupt change in diameter which otherwise would be noticeable as the respective sections telescope with respect to each other as the vehicle units 10 and 11 angle one to the other in passing about curves in the track.

From the foregoing it will be seen that there has been provided a passageway arrangement comprising an exceptionally wide, insulated diaphragm and transversely flexible footplate specifically suited to articulated constructions and which is adapted to be divided to provide a plurality of individual passages for use separately.

What is claimed is:

1. In a multi-unit vehicle, a passageway between adjoining units including spaced concentric metallic extension structures on the respective units, insulation between said structures on each unit, spaced concentric inherently elastic diaphragms in tension between said respective extension structures and sealed with respect to each other to provide dead air insulation therebetween, a footplate in said passageway, and means supporting said footplate from said extension structures.

2. In an articulated unit vehicle, a passageway construction comprising a footplate bridging the space between associated units and fixedly secured to one of said units but flexible with respect thereto, said footplate being rigid across said space but flexible transversely, a diaphragm extending between and secured to the respective units under initial tension and completely encircling said footplate, a second diaphragm extending between and secured to the respective units in spaced concentric relation to said first diaphragm and sealed with respect thereto, and a flexible partition extending between said units dividing said passageway.

3. In an articulated unit vehicle, a passageway arrangement comprising a footplate bridging the space between associated units, a double diaphragm construction encircling said footplate, and a partition extending between said units and encircled by said diaphragm to provide a dual passageway therethrough.

4. In an articulated unit vehicle, a passageway arrangement comprising a footplate bridging the space between associated units and fixedly secured to one of said units, a diaphragm encircling the footplate, and a partition extending between said units and encircled by the diaphragm to provide a dual passageway therethrough.

5. In an articulated unit vehicle, a passageway arrangement including an inherently elastic diaphragm extending between and secured to the respective associated units under initial tension, a footplate in the passageway, and an inherently elastic partition secured between said units and encircled by the diaphragm to provide a dual passageway.

6. In an articulated unit vehicle, a passageway arrangement including an inherently elastic diaphragm extending between and secured to the respective associated units, a footplate in the passageway inherently flexible in one direction and bridging the space between said units, and an inherently elastic partition extending between and secured to said units and encircled by the diaphragm to provide a dual passageway.

7. In a multi-unit vehicle, a passageway between adjoining units including a nonmetallic footplate in the passageway fixedly secured to one of said units and flexing with respect thereto but providing an inflexible bridge across the space between said units and flexible in a transverse direction, an inherently elastic diaphragm extending between and secured to the respective associated units under initial tension, a second inherently elastic diaphragm extending between and secured to said units in spaced concentric relation to said first diaphragm and sealed with respect thereto, an inherently elastic partition in tension between said units extending through and encircled by said first diaphragm to provide a dual passageway, and a third inherently elastic diaphragm extending between and secured to said units in spaced substantially concentric relation to said second diaphragm and disposed at the perimeter of said units.

8. In a multi-unit vehicle, a passageway between adjoining units including a nonmetallic footplate in the passageway secured to one of said units and flexing with respect thereto and having longitudinally disposed stiffeners whereby the footplate provides a bridge relatively inflexible longitudinally across the space between said units but flexible in a transverse direction, an inherently elastic diaphragm extending between and secured to the respective associated units under initial tension, and a second inherently elastic diaphragm extending between and secured to said units in spaced concentric relation to said first diaphragm and sealed with respect thereto.

9. In a multi-unit vehicle, a passageway between adjoining spaced units including a nonmetallic footplate in the passageway secured to one of said units and flexing with respect thereto and having longitudinally disposed stiffeners whereby the footplate provides a bridge relatively inflexible longitudinally across the space between said units but flexible transversely, and an inherently elastic diaphragm extending between and secured to said units.

10. In a multi-unit vehicle, a diaphragm construction between adjoining units including an inherently elastic diaphragm extending between and secured to said units under initial tension and completely encircling said passageway, a second inherently elastic diaphragm extending between and secured to said units under initial tension in spaced concentric relation to said first diaphragm but stopping short of coextension therewith, and inherently elastic means sealing the space between said diaphragms where said second diaphragm stops short.

11. In an articulated unit vehicle, a diaphragm arrangement including a diaphragm extending between and secured to respectively associated units, an inherently elastic partition extending between said units under initial tension and encircled by the diaphragm to provide a dual passageway, and telescopic guard rails upon opposite sides of said elastic partition connected to said associated units.

12. In an articulated unit vehicle, a passageway construction comprising a footplate bridging the space between associated units, a diaphragm extending between and secured to said units under initial tension and completely encircling said footplate, a second diaphragm extending between the units in spaced concentric relation to said first diaphragm and sealed with respect thereto, and a flexible partition extending between said units under initial tension and dividing said passageway.

13. In an articulated unit vehicle, a passageway arrangement including an inherently elastic diaphragm extending between and secured to the respective associated units, a footplate bridging the space between said units disposed in the passageway, and an inherently elastic partition in tension between said units encircled by the diaphragm to provide a dual passageway.

14. In a multi-unit vehicle, a passageway between adjoining units including a footplate fixedly secured to one of said units and providing a bridge through the passageway across the space between said units, an inherently elastic diaphragm extending between and secured to the respective associated units, a second inherently elastic diaphragm extending between and secured to said units in spaced concentric relation to said first diaphragm and sealed with respect thereto, an inherently elastic partition extending between and secured to said units and encircled by said first diaphragm to provide a dual passageway, and a third inherently elastic diaphragm extending between and secured to said units in spaced substantially concentric relation to said second diaphragm and disposed at the perimeter of said units.

15. A diaphragm construction between adjoining railway cars including an inherently elastic diaphragm extending between and secured to the respective cars under initial tension, and an inherently elastic partition extending between and secured to the respective cars under initial tension and encircled by said diaphragm to provide a dual passageway.

16. A diaphragm construction between adjoining railway cars including a diaphragm extending between and secured to the respective cars, and an inherently elastic partition extending between and secured to the respective cars under initial tension and encircled by said diaphragm to provide a dual passageway.

17. A diaphragm construction between adjoining railway cars including a diaphragm extending between and secured to the respective cars, and a partition extending between and secured to the respective cars and encircled by said diaphragm to provide a dual passageway.

18. In a multi-unit vehicle having a footplate between adjoining units, a passageway above the footplate, an inherently elastic diaphragm completely enclosing said passageway, extending between and secured in sealed relation to said units under initial tension, and a second inherently elastic diaphragm completely enclosing said passageway, extending between said units in spaced concentric relation to said first diaphragm and secured to said units in sealed relation, the space between said diaphragms being sealed from the outer air and from said passageway to provide a layer of dead air between the diaphragms for insulation of said passageway.

19. In a multi-unit vehicle, a passageway between adjoining units, an inherently elastic diaphragm extending between and secured in sealed relation to said units under initial tension and completely encircling said passageway, and a second inherently elastic diaphragm encircling a substantial portion of the passageway, extending between and secured in sealed relation to said units in spaced concentric relation to said first diaphragm and having its ends sealed with relation to said first diaphragm to provide a layer of dead air in the space between the two diaphragms for insulation of said passageway.

20. In a multi-unit vehicle having adjacent units provided with juxtaposed end walls, spaced concentric metallic extension structures on each unit about an opening in the end wall thereof, insulation between the extension structures on each unit, spaced concentric inherently elastic diaphragms extending between and secured in sealed relation to said respective extension structures to define a passageway between the units, and flexible means sealing the space between said diaphragms to provide dead air insulation therebetween.

21. In a multi-unit vehicle, a passageway between adjoining units including a footplate secured to one of the units and providing a bridge through the passageway across the space between the units, an inherently elastic diaphragm extending between and secured in sealed relation to the respective units and completely encircling said passageway, and a second inherently elastic diaphragm encircling a substantial portion of the passageway, extending between and secured in sealed relation to said units in spaced concentric relation to said first diaphragm and sealed with respect thereto adjacent to the footplate to provide a layer of dead air between the diaphragms for insulation of said passageway.

ANDREW CHRISTIANSON.